(12) United States Patent
Sloan et al.

(10) Patent No.: US 11,782,154 B1
(45) Date of Patent: Oct. 10, 2023

(54) TERRAIN-AIDED POSITION DETERMINATION USING RANGE ANGLE RADAR ALTIMETRY

(71) Applicant: National Technology & Engineering Solutions of Sandia, LLC, Albuquerque, NM (US)

(72) Inventors: George R. Sloan, Albuquerque, NM (US); Tucker Caelan Ellis Haydon, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 87 days.

(21) Appl. No.: 17/515,720

(22) Filed: Nov. 1, 2021

(51) Int. Cl.
*G01S 13/933* (2020.01)

(52) U.S. Cl.
CPC ................................. *G01S 13/933* (2020.01)

(58) Field of Classification Search
CPC .................................................... G01S 13/933
See application file for complete search history.

(56) References Cited

U.S. PATENT DOCUMENTS

| | | | |
|---|---|---|---|
| 3,328,795 A | 6/1967 | Hallmark | |
| 4,829,304 A | 5/1989 | Baird | |
| 4,910,674 A | 3/1990 | Lerche | |
| 6,218,910 B1 | 4/2001 | Goebel et al. | |
| 6,512,976 B1 | 1/2003 | Sabatino et al. | |
| 7,522,090 B2 | 4/2009 | Hawkinson | |
| 9,110,170 B1 | 8/2015 | Woollard et al. | |
| 9,404,754 B2 | 8/2016 | Caylor et al. | |
| 10,641,885 B2 | 5/2020 | Frick | |
| 2012/0281507 A1* | 11/2012 | Rikoski | G05D 1/0692 367/88 |
| 2019/0191334 A1* | 6/2019 | Montsma | H04W 28/085 |
| 2021/0109210 A1* | 4/2021 | Kabakian | G01S 13/9004 |

(Continued)

FOREIGN PATENT DOCUMENTS

| | | |
|---|---|---|
| EP | 3056922 A2 | 2/2016 |
| EP | 3893023 A1 * | 10/2021 |
| WO | 2001059474 | 8/2001 |

OTHER PUBLICATIONS

Anonsen, K. and Hallingstad, O., "Sigma Point Kalman Filter for Underwater Terrain-Based Navigation," IFAC Proceedings Volumes, 2017, vol. 40, pp. 106-110.

(Continued)

*Primary Examiner* — Timothy A Brainard
*Assistant Examiner* — Kenneth W Good
(74) *Attorney, Agent, or Firm* — Mark A. Dodd

(57) ABSTRACT

Various embodiments described herein provide for a terrain-aided location determination using a range/angle radar altimetry. Range/angle radar systems use vertical synthetic aperture radar measurements which do not include any cross-track resolution, such that if a range/Doppler cloud from a single VSAR image is compared to a regular DEM, there can be ambiguity in determining the cross-track position. By modifying the DEM to inherently include additional terrain signature information that could be compared to VSAR measurement, the limitation can be overcome, and a single range/angle radar system can provide an accurate position without the additional complexity of a range/angle/angle radar system.

19 Claims, 7 Drawing Sheets

(56) References Cited

U.S. PATENT DOCUMENTS

2021/0311504 A1* 10/2021 Chai ................ G05D 1/101
2022/0066015 A1* 3/2022 Burghardt ............ G01S 13/582

OTHER PUBLICATIONS

Choi, S. et al., "A new Approach of FMCW-DBS Altimeters for Terrain-aided Navigation," 2013, Asia-Pacific Conference on Synthetic Aperture Radar (APSAR).

Chun, J. et al., "End-to-end design consideration of a radar altimeter for terrain-aided navigation," 2013, Proc. of SPIE vol. 8891, 889108-1.

Cowie, M. et al., "Latest Development of the TERPROM® Digital Terrain System (DTS)," 2008, IEEE/ION Position, Location and Navigation Symposium, Monterey, CA, USA, 2008, pp. 1219-1229.

Gaudet, B. and Furfaro, R., "A Naviagation Scheme for Pinpoint Mars Landing using Radar Altimetry, A Digital Terrain Model, and a Particle Filter," 2013, AAS/AIAA Astrodynamics Specialist Conference.

Golden J. P., "Terrain contour matching (TERCOM): a cruise missile guidance aid," 1980, SPIE vol. 238 Image Processing for Missile Guidance, pp. 10-18.

Hostetler, L., "Optimal Terrain-Aided Navigation Systems," 1978, American Institute of Aeronautics and Astronautics, https://doi.org/10.2514/6.1978-1243.

Jensen, D., "PTANS Potential," 2004, Avionics International, https://www.aviationtoday.com/2004/07/01/ptans-potential/.

Jeon, H. et al., "Modified sequential processing terrain referenced navigation considering slant range measurement," ET Radar Sonar Navig., 2018, vol. 12 . pp. 1208-1216.

Kim, Y. et al., "Terrain-Referenced Navigation using an Interferometric Radar Altimeter," Journal of the Institute of Navigation, 2018, vol. 65, pp. 157-167.

Nygren, I. and Jansson, M., "Terrain Navigation for Underwater Vehicles Using the Correlator Method," IEEE Jorunal of Oceanic Engineering, 2004, vol. 29, pp. 906-915.

Oh, J. et al., "A New Method to Calculate Relative Distance of Closest Terrain Point Using Interferometric Radar Altimeter Output in Real Flight Environment," 2018 IEEE/ION Position, Location and Navigation Symposium (PLANS), Monterey, CA, USA, pp. 141-148, doi: 10.1109/PLANS.2018.8373375.

Oh, J. et al., "Accurate Measurement Calculation Method for Interferometric Radar Altimeter-Based Terrain Referenced Navigation," Sensors, 2019, vol. 19, 1688.

Park, J. et al., "A New Measurement Model of Interferometric Radar Altimeter for Terrain Referenced Navigation using Particle Filter," 2017 European Navigation Conference (ENC), Lausanne, Switzerland, 2017, pp. 57-64, doi: 10.1109/EURONAV.2017.7954173.

Reed, C. G. et al., "The range only correlation system," Proceedings of the SPIE, 1980, vol. 238, pp. 42-49 (1980).

Spiegel, P. et al., "Improvement of Surface Aided Navigation," 2016 IEEE/ION Position, Location and Navigation Symposium (PLANS), Savannah, GA, USA, 2016, pp. 320-329, doi: 10.1109/PLANS.2016.7479716.

Spiegel, P. et al., "Slant Range Analysis and Inflight Compensation of Radar Altimeter Flight Test Data," Journal of the Institute of Navigation, 2016, vol. 63, pp. 493-509.

Vaman, D. et al., "TRN History, Trends and the Unused Potential," 2012 IEEE/AIAA 31st Digital Avionics Systems Conference (DASC), Williamsburg, VA, USA, 2012, pp. 1A3-1-1A3-16, doi: 10.1109/DASC.2012.6382278.

Zelenka, R., "Design and Analysis of a Kalman Filter for Terrain-Referenced Positioning and Guidance," Journal of Aircraft, 1994, vol. 31, pp. 339-344.

Zhao, L. et al., "A Novel Terrain-Aided Navigation Algorithm Combined With the TERCOM Algorithm and Particle Filter," IEEE Sensors Journal, 2015, vol. 15, pp. 1124-1131.

* cited by examiner

TERRAIN-AIDED POSITION DETERMINATION USING RANGE ANGLE RADAR ALTIMETRY

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Terrain-aided positioning systems provide positioning data by comparing terrain measurements (generated based upon outputs of sensors) with a digital elevation map (DEM). An airborne vehicle or device can navigate over an area of the earth using an inertial navigation system and the measured terrain profile underneath the airborne vehicle or device. Terrain measurements have conventionally been obtained by using radar altimeters, but there are drawbacks to the use of radar altimeters, particularly when used at high altitudes. For example, at high altitudes, radar measurements of the nadir area, directly below the vehicle, can include terrain of varying elevation; however, a conventional terrain-aided positioning system cannot distinguish between a return from nadir and a return from a higher elevation point on the beam edge. More complex solutions, which improve cross-track resolution can require the use of multiple antennas (interferometric radar modes), and dramatically increase the computational requirements used to process the radar returns.

SUMMARY

The following is a brief summary of subject matter that is described in greater detail herein. This summary is not intended to be limiting as to the scope of the claims.

Various embodiments described herein provide for terrain-aided position determination using range-angle radar altimetry. Range/angle radar systems generally measure the range and Doppler angle to illuminated ground points. In some embodiments, range/angle radar systems use vertical synthetic aperture radar (VSAR) measurements, which do not include any cross-track resolution, such that if a range/Doppler cloud from a single VSAR image is compared to a regular digital elevation map (DEM), there can be ambiguity in determining the radar's cross-track position. By modifying the DEM to inherently include additional terrain signature information that can be compared to a VSAR measurement, the limitation can be overcome, and a single range/angle radar system can provide an accurate position without the additional complexity of a range/angle/angle radar system (e.g., multiple antennas and associated processing).

To accomplish this, a modified DEM is created by determining the expected minimum range in the nadir Doppler bin (MRND) for each grid point of a specified area for a given altitude and heading. The MRND value thus represents the shortest distance between the radar and the ground for a given Doppler bin. The modified DEM is an array of predicted MRND values and is created from a model of radar performance over a specified sub-section of a standard DEM (parent DEM). This modified DEM can then be correlated to a linear tail of measurements made by a VSAR radar, and the resulting correlation includes a positional signature in both the along-track and the cross-track direction.

In one or more embodiments, a system can include a memory that stores computer-executable instructions and a processor that executes the computer-executable instructions that cause the processor to perform operations including receiving a modified digital elevation map for an area of the earth, the modified digital elevation map comprising a first set of predicted minimum range nadir Doppler bin values for a reference vector based on a reference heading and a reference altitude of a device travelling over the area of the earth. The operations can also include identifying a second set of minimum range nadir Doppler bin values corresponding to a set of radar measurements generated by a radar system of the device. The operations can also include correlating, in two dimensions, the second set of minimum range nadir Doppler bin values to the first set of minimum range nadir Doppler bin values to determine a position of the device over the area of the earth and controlling an operation of the device based on the determined position of the device.

In another embodiment, a method can include receiving a modified digital elevation map for a defined area comprising a set of predicted minimum range radar measurements of nadir Doppler bins at reference locations based on a reference heading and altitude. The method can also include determining actual minimum range radar measurements of nadir Doppler bins at measurement locations, wherein the actual minimum range radar measurements are generated by a radar system. The method can also include correlating, in two dimensions, the actual minimum range radar measurements to a subset of the set of predicted minimum range radar measurements to determine a position of an airborne vehicle. The method can also include controlling an operation of the airborne vehicle based on the determined position of the airborne vehicle.

In another embodiment, a computer-readable storage medium can comprise instructions that when executed by a processor can perform the following acts, including calculating a modified digital elevation map for a defined area comprising a set of predicted minimum range radar measurements of nadir Doppler bins based on a reference heading and a reference altitude. The acts can also include receiving vertical synthetic aperture radar images from a radar system of an airborne vehicle flying over the defined area at predetermined intervals and determining actual minimum range radar measurements of nadir Doppler bins of the vertical synthetic aperture radar images. The acts can also include correlating, in two dimensions, the actual minimum range radar measurements to a subset of the set of predicted minimum range radar measurements to determine a position and controlling an operation of the airborne vehicle based on the determined position.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
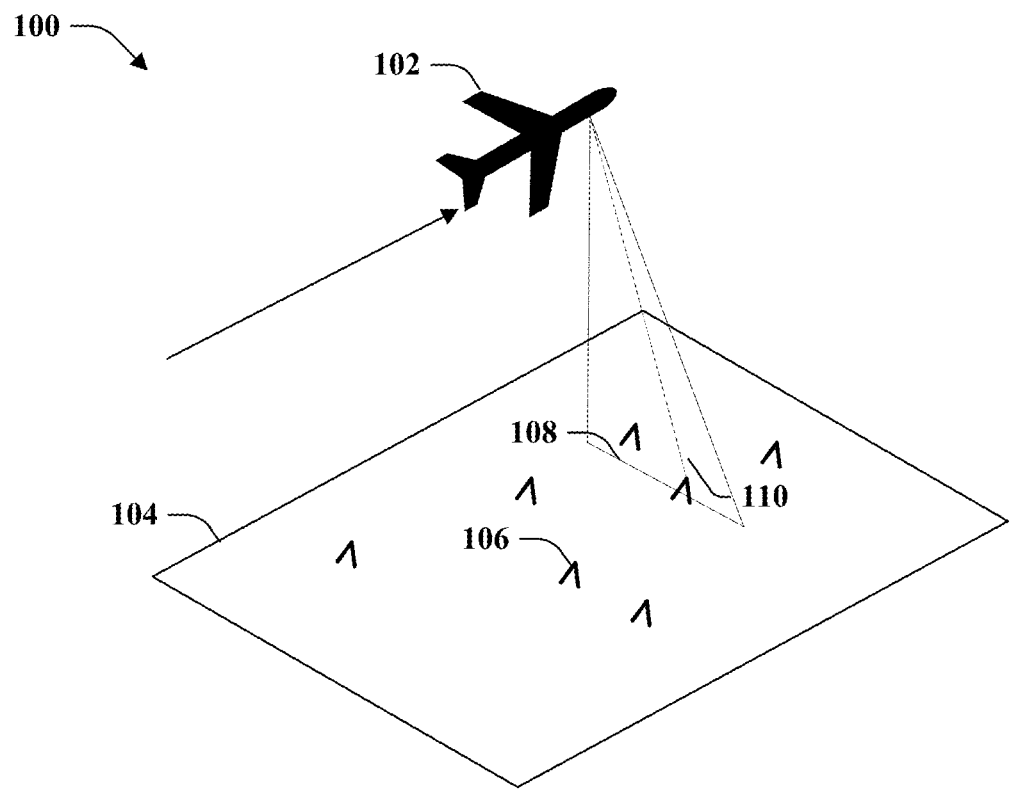
FIG. 1 is an exemplary embodiment of an airborne vehicle that determines an MRND measurement.

Various technologies pertaining to terrain-aided position determination using range/angle radar altimetry are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something and is not intended to indicate a preference.

With reference to FIG. 1, a schematic 100 that illustrates an airborne vehicle 102 is illustrated, where the airborne vehicle 102 includes a navigation system (not shown) that is configured to determine a minimum range Doppler bin measurement. The airborne vehicle 102 can fly over an area of the earth 104 and navigate by analyzing radar returns from the ground. Further, the navigation system referenced above can identify terrain (e.g., mountain 106) that the airborne vehicle 102 is passing over based on a known terrain map stored in computer-readable storage of the airborne vehicle 102.

Simple range-only radar systems can be used for terrain navigation when the beam footprint can be adequately constrained by a combination of low flight altitude or use of a high gain (narrow beam) antenna. Under such conditions, the footprint of a radar beam at nadir likely includes terrain with similar elevations and the minimum range return is likely close to the nadir point, allowing a reasonable comparison between the radar-measured height, and the nadir height predicted from a standard digital elevation map. A measurement tail (that includes minimum range returns over time as the airborne vehicle travels over the earth 104) can be correlated with a DEM to determine position, heading, and elevation of the airborne vehicle 102. At higher altitudes or with lower gain antennas, however, due to higher levels of terrain unevenness, the minimum range return might be at a location that is significantly separated from the nadir point, given that the beamwidth of the radar may cover a relatively large area underneath the airborne vehicle 102. This is shown in FIG. 1, where a mountain or other terrain high point can be the minimum range location 110 of the radar beam 108 even though it is not directly underneath airborne vehicle 102. While adding a monopulse mode or other interferometric radar embodiment to achieve a cross-track resolving capability (Range/Angle/Angle or R/A/A system) solves this issue, such a capability comes at a significant cost in terms of computational and radar and antenna system complexity.

The navigation system disclosed herein is based on a single antenna, Range/Angle (R/A) radar system that uses the MRND (minimum range in the nadir Doppler bin) approach to improve the positioning accuracy of the R/A radar system. This navigation system/approach can greatly improve the accuracy relative to both range-only radar systems, as well as previously available R/A-based systems, especially at higher altitudes, while not requiring the significant added complexity of a R/A/A radar. The navigation system takes altimeter measurements from the R/A radar system (also known as a vertical synthetic aperture radar (VSAR)). From each VSAR image, the navigation system determines and retains the MRND return. A predetermined number of such measurements (with a specified separation distance between measurements) form the altimeter measurement tail, and the navigation system correlates the altimeter measurement tail with a reference terrain map to determine a position estimate of the airborne vehicle 102. The reference terrain map (modified DEM) is created by modifying a standard digital elevation map (DEM) to represent the expected MRND value for each grid point. The end result is a position estimate that is accurate in three dimensions, even though the original R/A altimeter measurements did not include any cross-track resolution. Hence, the MRND approach is designed to offer accuracy close to that only previously obtainable from a full R/A/A system, including in the cross-track dimension, but without requiring the complexity of a R/A/A radar.

A key reason for the enhanced accuracy of the MRND approach is because the measured MRND values are compared to predicted MRND values instead of to standard nadir height predictions. That is, the measurement tail is correlated across a modified DEM instead of across standard DEM. An inherent limitation of this approach is the modified DEM, being a set of predicted MRND values, is unique to a specified height and heading. This is because the MRND values are extracted from slices of the beam footprint (nadir Doppler bins), and the beam footprint size and orientation is dependent on the platform height and heading. Hence, changes in altitude or direction will require a new modified DEM to obtain an updated position. The modified DEM can be computed ahead of time, based on an expected or planned flight path. In other embodiments, the modified DEM can be calculated by the navigation system in real-time, based on a previous known heading and/or altitude.

Figure 2:
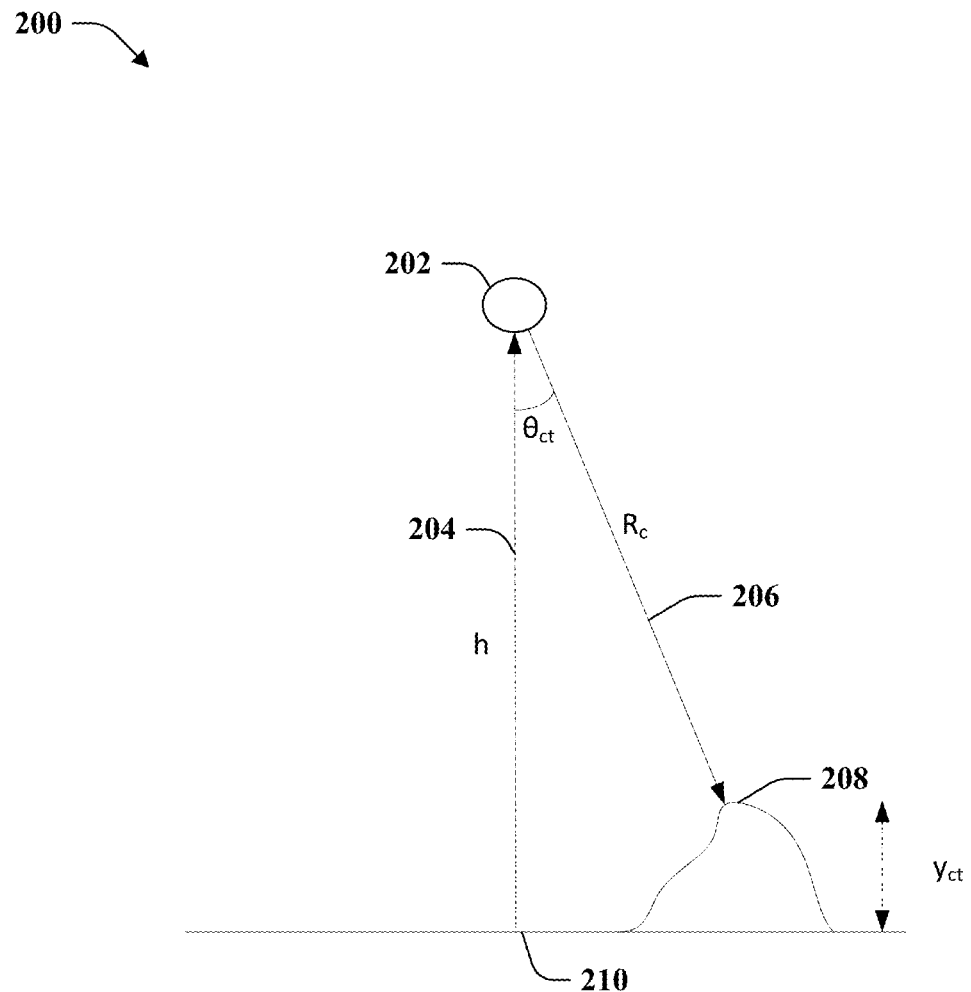
FIG. 2 is an exemplary schematic that illustrates a determination of the MRND measurement.

Turning now to FIG. 2, illustrated is an exemplary schematic 200 that depicts a navigation system determining a minimum range nadir Doppler bin measurement. The diagram in FIG. 2 depicts how a cross-track elevation increase can result in the MRND return location separating from the nadir point.

For example, the nadir point 210 under the radar system 202 would be the minimum range return location 204 if the terrain were flat, but due to the elevated area at 208, the radar return at 206 is actually the minimum range location in the nadir Doppler bin. The cross-track range ($R_c$) is less than the radar nadir height h if the local ground elevation $y_{ct}$ satisfies the following condition:

$$y_{ct} > h(1 - \cos \theta_{ct}) \qquad \text{Eqn 1:}$$

For example, for a nadir height of 100 k ft and a cross-track angle of 2°, the MRND return will be from this position if the local ground height ($y_{ct}$) is greater than 61 ft (relative to the nadir height). The allowable extent of $\theta_{ct}$ can be primarily determined by the antenna beamwidth in the cross-track dimension, and the corresponding ground extent can be a function of the radar height h. As the cross-track angle increases, the required minimum local ground height also grows. That is, this simple equation gives an indication of the relative local terrain height needed for the MRND return area to have a specified angular separation from the nadir point 210.

Figure 3:
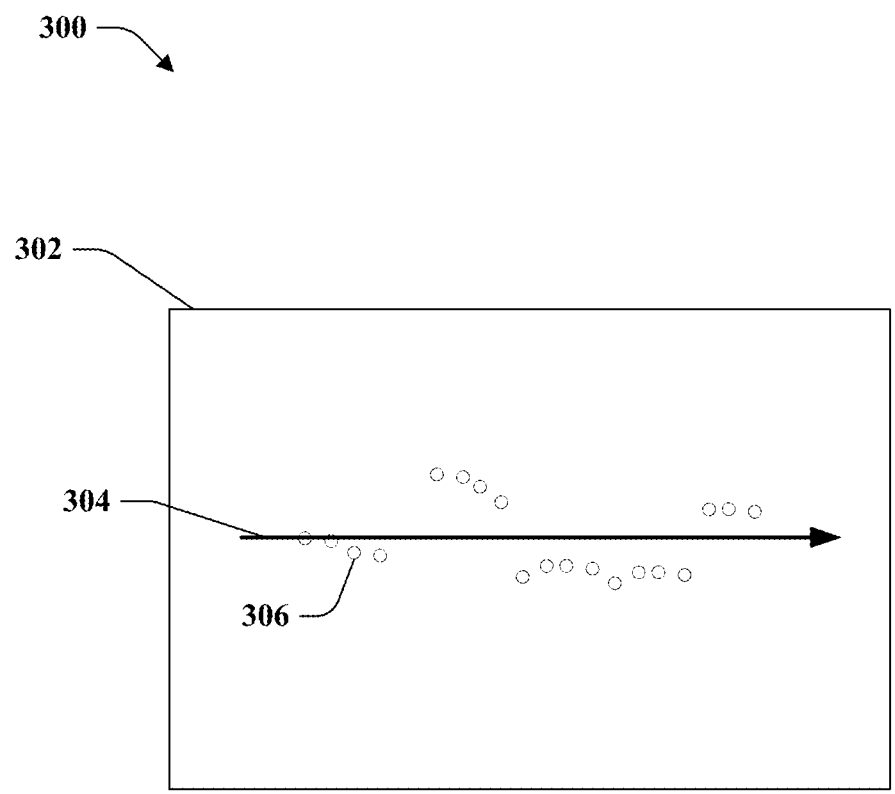
FIG. 3 is an exemplary plot that depicts the reference flight path and predicted MRND return areas of a reference tail of a modified DEM.

Turning now to FIG. 3, illustrated is a plot 300 of an overhead view of the parent DEM area. Area 302 is the DEM portion known to enclose the reference flight path and is the area for which a modified DEM is created. Line 304 is the reference flight path that shows the corresponding predicted MRND return areas 306, showing again how terrain variation can move the MRND return areas 306 away from the ground track. The modified DEM is a grid of predicted MRND values. Because the radar beam footprint varies with the platform height and heading, a modified DEM is unique to the specified reference height and heading used to create it. The system creates the modified DEM 302 based on the basic radar, antenna, and flight path parameters (altitude, heading, velocity, antenna two-way beamwidth, slow/fast time fast Fourier transform (FFT) sizes, pulse repetition frequency, range resolution, etc.). A series of MRND values associated with the return areas 306 constitute a measurement tail vector (if determined by the radar) or a reference tail vector (if extracted from the modified DEM).

Figure 4:
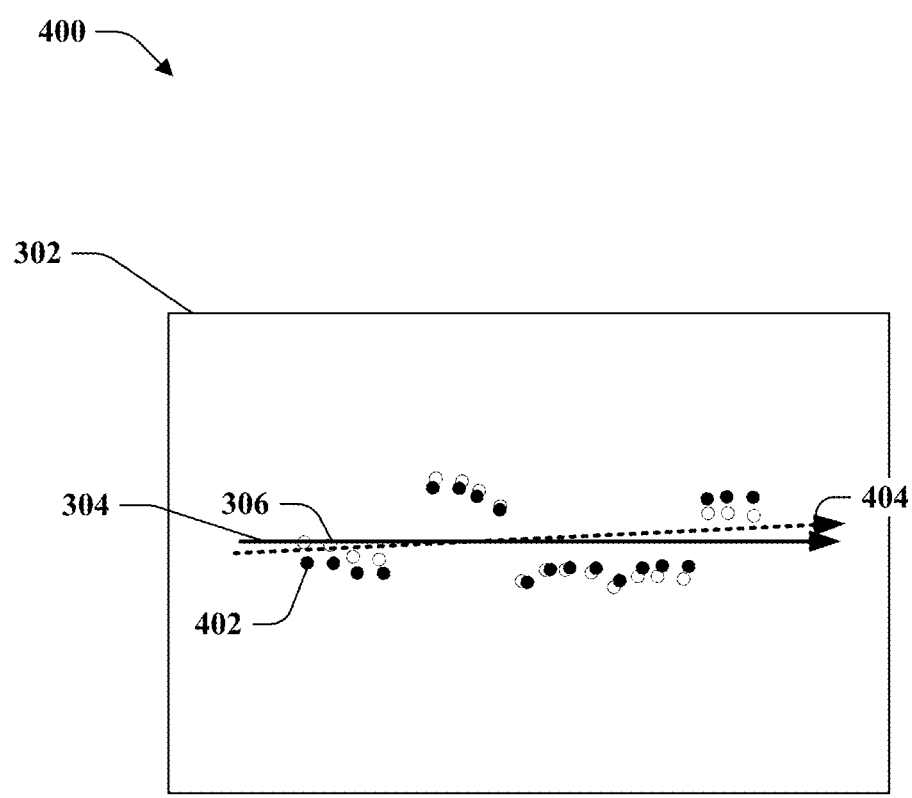
FIG. 4 is an exemplary plot that depicts how a heading change can shift MRND return areas.

Turning now to FIG. 4, illustrated is a plot 400 of a ground track (304) at a cardinal heading and a ground track (404) at a slightly rotated heading. Also shown, are the associated MRND return areas (402 and 306), illustrating how a heading change can shift the position of the MRND return areas and associated MRND values.

A modified DEM is created based on a set of input parameters with the DEM centered in the area where a position determination will be performed. This reference location is either preplanned or estimated from the most recent position estimate and associated inertial measurements. The modified DEM extents must be large enough to enclose the maximum expected error in the reference position estimate. Based on the reference height and heading, the modified DEM 302 values can be generated for each grid point by 1) determining the Doppler and range return values in a footprint segment slightly larger than the nadir bin, 2) downselecting the returns that are proven to be in the nadir bin (based on the calculated Doppler), and 3) determining the minimum range return in the downselected group and storing that value.

In some embodiments, the modified DEM can be created before the flight based on a planned flight path and the known inertial navigation system accuracy. In other embodiments, the modified DEM can be calculated in real-time, using embedded processing. The real-time modified DEM creation can occur before, during, or just after the measurement tail is created by the radar, with the modified DEM center ideally being based on the best estimate of the position at the time of the middle tail point. In other words, if the creation occurs before the measurement tail, the most recent position estimate along with and the most recent inertial measurements are used to predict where the tail center will occur, and this becomes the modified DEM center. Conversely, if the creation occurs after the tail, backward-looking calculations can be applied to estimate where the system was at the time of the tail center point. Ideally, an inertially based position estimate should occur as close as possible to the tail center point time. Processor capability and algorithm run times will affect the optimization of how real-time modified DEM creation is performed. The initial reference position accuracy, the inertial system accuracy, the platform velocity, and the modified DEM size determine what segment of a flight path a modified DEM can be applied to. If the modified DEM is large enough, multiple tails and a large flight segment can exploit a single modified DEM. Regardless, any significant heading or height change will require the creation of a new modified DEM. Simulations can predict what heading and height changes can be tolerated without requiring creation of a new modified DEM.

In some instances, the number and spatial distribution of the measured MRND returns may be adjusted to accommodate the overflown terrain. Specifically, by adjusting the number and spatial distribution of the measured MRND returns, one may optimize various parameters, for example, improve navigation accuracy or decrease processing time.

If the heading is not parallel to either the parent DEM rows or columns, the DEM can be rotated such that either the rows or columns align with the heading. The rotation process is achieved by performing a 2D interpolation/resampling such that the DEM heights are reported on a grid that is parallel/perpendicular to the reference heading. The modified DEM is then created from the rotated parent DEM. This adjustment enables significant computational efficiency in the generation of the modified DEM and in the MRND position determination processing. The resampling process can be computationally intensive, but how significant this issue is for an application depends on whether a flight path can be preplanned, and if not, it depends on the level of embedded processing capacity that is practical for a given scenario.

The system determines the position by comparing the radar-based measurement tail to reference tails extracted from the modified DEM. The position is based on the position of the reference tail that best matches the measurement tail. That is, the measurement tail is 2D-correlated against the modified DEM. However, instead of classic correlation, the comparison may be based, for example, on determining the root-mean-square (RMS) error between the measurement tail and reference tail vectors. In this embodiment, the mean range is first subtracted from each tail point prior to the comparison, which means only the relative wiggle in each tail vector is compared. The 2D comparison process results in an RMS error value at each grid point, which taken together, constitutes a sampled error surface. The location of the error surface minimum corresponds to the position.

The shape of the error surface provides a quality estimate of the overall process. To the extent the error surface is shaped like a single narrow funnel, it is ideal. To the extent the area near the minimum is wide and rounded, the surface is of lesser quality, though not necessarily resulting in degraded accuracy. Also, additional minima or large sidelobes indicate degraded quality leading to a potential position ambiguity. One method to characterize error surface quality is to determine the contour line at a specified RMS error increase above the minimum (say 3 m increase above the minimum), calculate the area corresponding to this contour, and then determining the effective radius of this area (circle radius yielding the same total area). This parameter provides a method for comparing the relative quality of different error surfaces. In general, higher quality error surfaces result from tails with a higher signature uniqueness (generally from rougher terrain).

In an embodiment, the predicted MRND measurements can be made in real-time after or at the same time as the MRND measurements are identified. This enables the system to continuously estimate the position of the airborne vehicle. A Kalman filter is used to evaluate radar data captured during the flight with synthetic data generated inflight. In an embodiment, the Kalman filter can be a non-linear Kalman filter, for example, a cubature Kalman filter (CKF). In other embodiments, different Kalman filters, for example, the extended Kalman filter (EKF) are also possible.

The CKF can jointly integrate relative motion and radar measurements by sampling the radar measurements, pushing the samples through the potentially non-linear state propagation or measured functions, and reconstructing the resulting probability distribution from the modified samples. To facilitate real-time operations, it is prudent to keep the number of measurement function evaluations low, so the proposed CKF only estimates the position of the radar and relegates the remaining navigation states to an unspecified complementary Kalman filter. A snapshot monitor assumes that measurements with high normalized innovation magnitudes are likely to have been caused by a system or modeling failure rather than expected noise. Measurements with high normalized innovation magnitudes are labeled as outliers and rejected by the CKF, thus the CKF can filter out some of the measured MRND values to improve the accuracy of the determined position.

Figure 5:
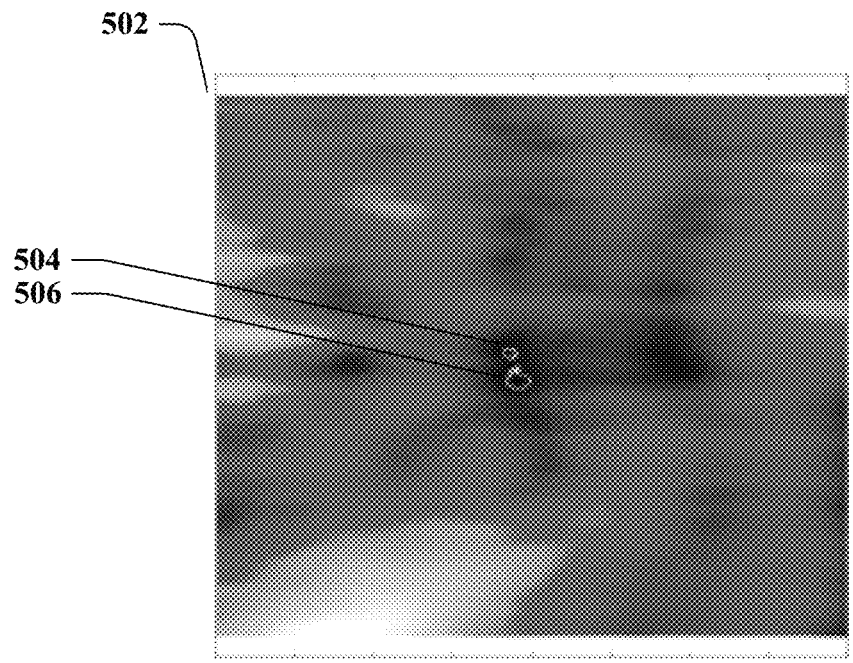
FIG. 5 is an exemplary root-mean-square (RMS) error color map of a measurement tail compared to a standard unmodified DEM.
Figure 6:
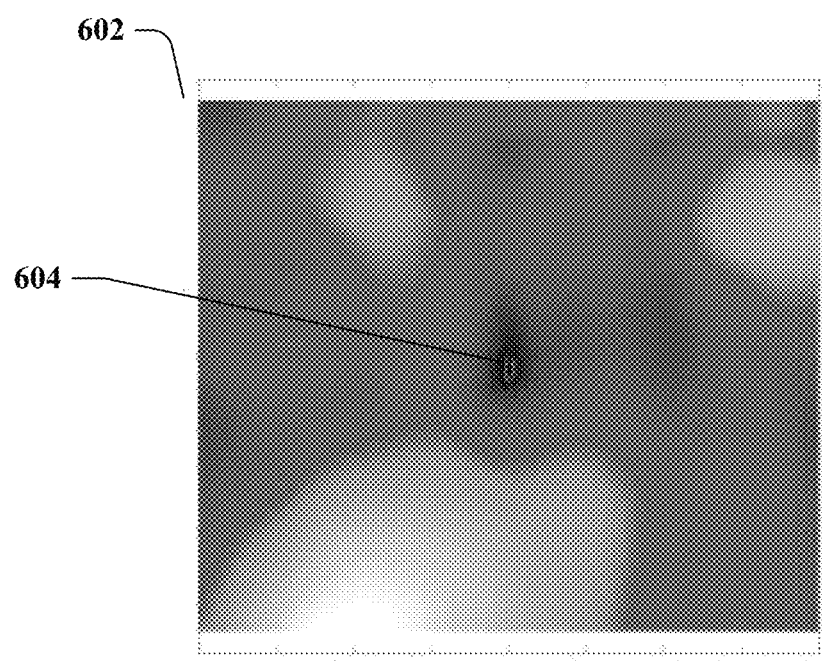
FIG. 6 is an exemplary RMS error color map of a measurement tail compared to an MRND modified DEM.

Turning now to FIG. 5 and FIG. 6, illustrated are exemplary plots of error surfaces (color maps) 502, 602, including contours of where the error surface is 3 m above the minimum. The surface 502 in FIG. 5 is based on the comparison of a measurement tail to an unmodified DEM (compromised of nadir heights), while the surface 602 in FIG. 6 is based on a comparison to a modified DEM (comprised of MRND values). Comparing the two surfaces 502, 602 provides a visual representation of the value of the MRND-based approach. A comparison shows that the surface derived from a modified DEM is of much higher quality, with a single, well defined, narrow lobe for the minimum 604. In contrast, the error surface derived from an unmodified DEM, shows multiple diffuse minima 504, 506, including multiple 3 m contours. In this example, the resulting radial position accuracy is more than 4× better using the modified DEM.

Figure 7:
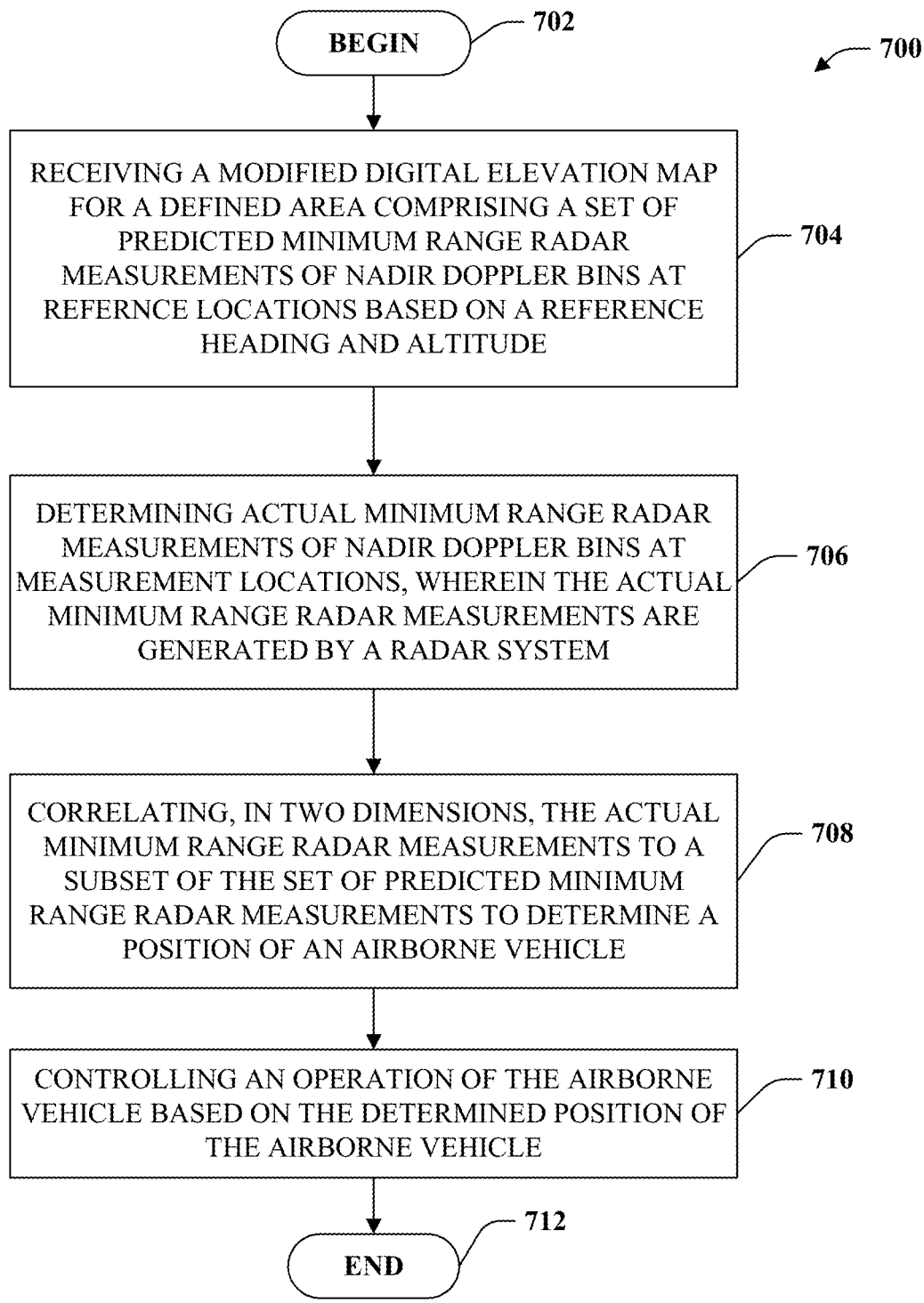
FIG. 7 is a flow diagram that illustrates an exemplary methodology for improving terrain-aided position determination through use of an MRND modified DEM.

FIG. 7 illustrates an exemplary methodology 700 relating to terrain assisted position determination using range-angle radar altimetry. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology 700 begins at 702, and at 704, the method can include the step of receiving a modified DEM for a defined area comprising a set of predicted minimum range radar measurements of nadir Doppler bins at reference locations based on a reference heading and reference altitude. The modified DEM covers a specified subset area of the parent DEM, and the modified DEM values are based on a reference altitude and heading. In an embodiment, the modified DEM can be received from a ground device and can correspond to planned path or current position. In other embodiments, the modified DEM can be generated by a device on the airborne vehicle At 706, the method can include the step of determining actual minimum range radar measurements of nadir Doppler bins at measurement locations, wherein the actual minimum range radar measurements are generated by a radar system.

At 708, the method can include the step of correlating, in two dimensions, the actual minimum range radar measurements to a subset of the set of predicted minimum range radar measurements to determine a position of an airborne vehicle.

At 710, the method can include the step of controlling an operation of the airborne vehicle based on the determined position of the airborne vehicle. In an embodiment, navigation information can be provided to a control system to facilitate control of the airborne vehicle, and in other embodiments, the navigation system can control the airborne vehicle directly and provide control information to correct the actual path of the airborne vehicle to match a planned path. In another embodiment, some operational functionality of the airborne vehicle is enabled/disabled or started/ended based upon the determined location.

While the methodology 700 illustrated in FIG. 7 is described as being undertaken by a single device, it is to be understood that multiple devices may be employed. For example, a first device located at a ground facility may generate the modified DEM in accordance with the step at 704. The modified DEM generated by the first device is then uploaded to a computer-readable medium in a second device located on an airborne vehicle 102, i.e., the airborne vehicle 102 thereby receives the modified DEM. This provides the benefit of reducing the computational load on the second device. The second device may then undertake the steps at 706, 708, and 710.

Figure 8:
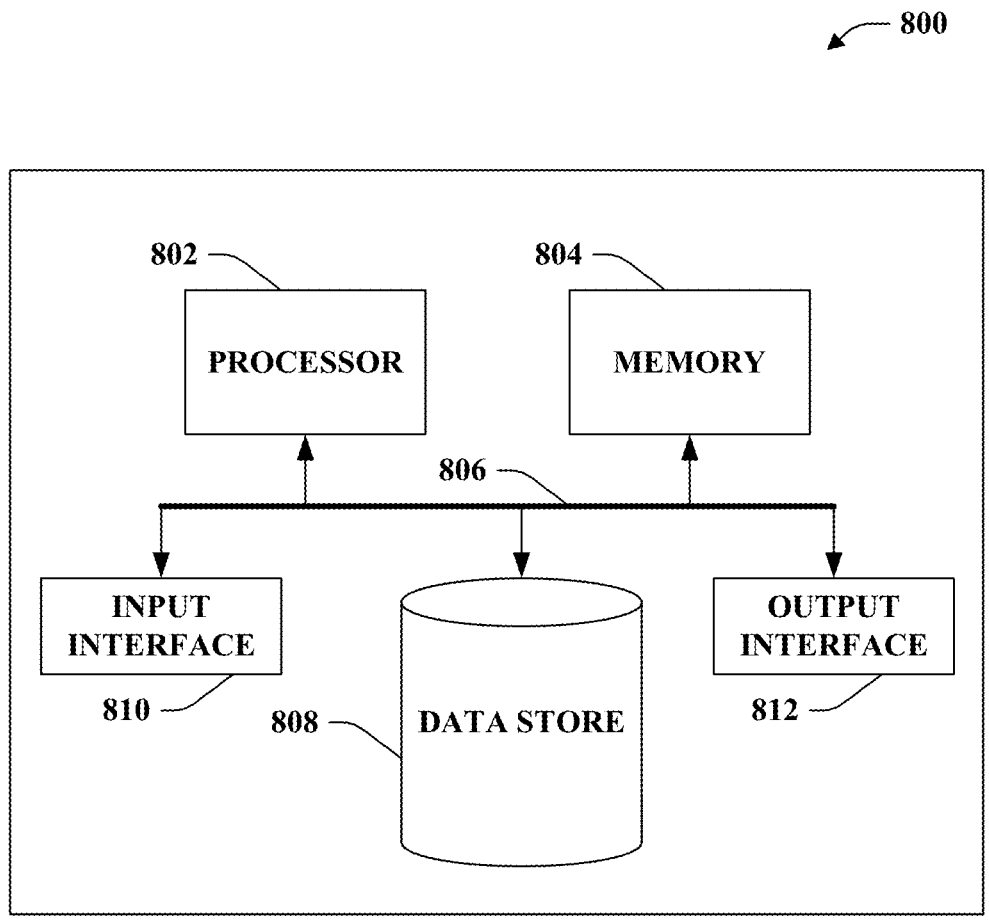
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that can perform terrain-aided navigation and position determination using range-angle radar altimetry. By way of another example, the computing device 800 can be used in a system that can receive parent DEM, create a corresponding modified DEM of predicted MRND returns for a defined subset of the parent DEM grid based on a specified altitude and heading, and then receive radar data (e.g., VSAR images), determine the actual MRND returns for defined locations, and correlate the MRND measurements with the modified DEM to identify a position of an airborne vehicle. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store both parent and modified DEMs, measurement data, position and heading information, etc.

The computing device 800 additionally includes a data store 808 that is accessible by the processor 802 by way of the system bus 806. The data store 808 may include executable instructions, DEMs, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
   a memory that stores computer-executable instructions; and
   a processor that executes the computer-executable instructions that cause the processor to perform operations, the operations comprising:
      receiving a modified digital elevation map for an area of the earth, the modified digital elevation map comprising a first set of predicted minimum range nadir Doppler bin values for a reference vector based on a reference heading and a reference altitude of a device travelling over the area of the earth;

identifying a second set of minimum range nadir Doppler bin values corresponding to a set of radar measurements generated by a radar system of the device;

correlating, in two dimensions, the second set of minimum range nadir Doppler bin values to the first set of minimum range nadir Doppler bin values to determine a position of the device over the area of the earth, wherein correlating comprises:

determining a root-mean-square error between respective pairs of the first set of minimum range nadir Doppler bin values and the second set of minimum range nadir Doppler bin values; and determining the position based on a location of a minimum root-mean-square error within an error surface; and controlling an operation of the device based on the determined position of the device.

2. The system of claim 1, wherein the operations further comprise:

determining a difference between a planned path and an actual path of the device, wherein a heading or an altitude is controlled based on the determined difference.

3. The system of claim 2, wherein when the device is to travel over the area of the earth by way of the planned path, the operations further comprise:

generating instructions to correct the actual path of the device based on the planned path.

4. The system of claim 1, wherein the operations further comprise:

determining the reference vector based on a previous heading and previous altitude.

5. The system of claim 1, wherein the operations further comprise:

determining the reference vector based on a planned path of the device.

6. The system of claim 1, wherein a radar measurement of the set of radar measurements is a minimum range in a nadir Doppler bin extracted from a set of range/Doppler cells of a vertical synthetic aperture radar image.

7. The system of claim 1, wherein the correlating is based on a non-linear Kalman filter that filters out one or more minimum range nadir Doppler bin values of the second set of minimum range nadir Doppler bin values that do not correspond to a set of predicted minimum range nadir Doppler bin values.

8. A method, comprising:

receiving a modified digital elevation map for a defined area comprising a set of predicted minimum range radar measurements of nadir Doppler bins at reference locations based on a reference heading and altitude;

determining actual minimum range radar measurements of nadir Doppler bins at measurement locations, wherein the actual minimum range radar measurements are generated by a radar system;

correlating, in two dimensions, the actual minimum range radar measurements to a subset of the set of predicted minimum range radar measurements to determine a position of an airborne vehicle, wherein correlating comprises:

determining a root-mean-square error between respective pairs of the first set of minimum range nadir Doppler bin values and the second set of minimum range nadir Doppler bin values; and determining the position based on a location of a minimum root-mean-square error within an error surface; and controlling an operation of the airborne vehicle based on the determined position of the airborne vehicle.

9. The method of claim 8, further comprising:

determining an actual path of the airborne vehicle based on a difference between the measurement locations and the reference locations, wherein at least one of a heading or an altitude of the airborne vehicle is controlled based upon the determined actual path of the airborne vehicle.

10. The method of claim 9, wherein the controlling the at least one of the heading or the altitude further comprises:

generating control information to correct the actual path of the airborne vehicle to match a planned path.

11. The method of claim 8, wherein the modified digital elevation map is received, from a ground-based device, at least one of a predetermined time or a predetermined distance away from a reference location of a reference map.

12. The method of claim 8, wherein the modified digital elevation map is based on a planned path of the airborne vehicle over the defined area.

13. The method of claim 8, further comprising:

determining the actual minimum range radar measurements of the nadir Doppler bins based on vertical synthetic aperture radar images at respective measurement locations.

14. The method of claim 8, further comprising:

determining that at least one of a heading or an altitude has changed; and in response to the determining, updating the modified digital elevation map.

15. A computer-readable storage medium comprising instructions that, when executed by a processor, perform the following acts:

receiving a modified digital elevation map for a defined area comprising a set of predicted minimum range radar measurements of nadir Doppler bins based on a reference heading and a reference altitude;

receiving vertical synthetic aperture radar images from a radar system of an airborne vehicle flying over the defined area at predetermined intervals;

determining actual minimum range radar measurements of nadir Doppler bins of the vertical synthetic aperture radar images;

correlating, in two dimensions, the actual minimum range radar measurements to a subset of the set of predicted minimum range radar measurements to determine a position, wherein correlating comprises:

determining a root-mean-square error between respective pairs of the first set of minimum range nadir Doppler bin values and the second set of minimum range nadir Doppler bin values; and determining the position based on a location of a minimum root-mean-square error within an error surface; and controlling an operation of the airborne vehicle based on the determined position.

16. The computer-readable storage medium of claim 15, further comprising instructions that, when executed by the processor, perform the act of:

determining an actual path of the airborne vehicle based on a difference between the actual minimum range radar measurements and the subset of the set of predicted minimum range radar measurements, wherein the operation of the airborne vehicle is controlled further based upon the determined actual path of the airborne vehicle.

17. The computer-readable storage medium of claim 16, further comprising instructions that, when executed by the processor, perform the act of:

generating control information to correct the actual path of the airborne vehicle to match a planned path.

18. The computer-readable storage medium of claim 15, further comprising instructions that, when executed by the processor, perform the act of:

determining the reference heading and the reference altitude based on a planned path.

19. The computer-readable storage medium of claim 16, further comprising instructions that, when executed by the processor, perform the act of:

determining the reference heading and the reference altitude based on a previous heading and a previous altitude.

* * * * *